Jan. 13, 1970     W. H. STOKES     3,489,258
PULSATING FALL RETARDER
Filed April 29, 1968
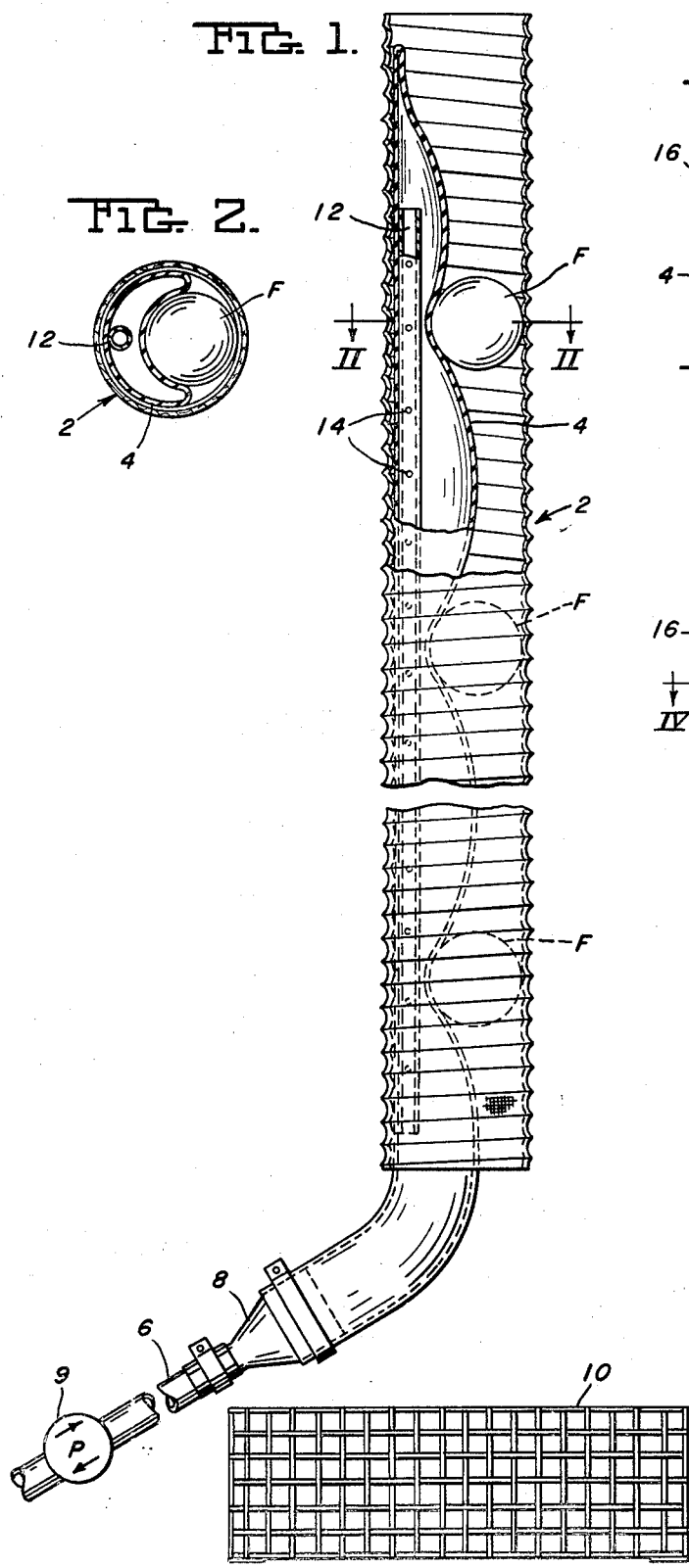
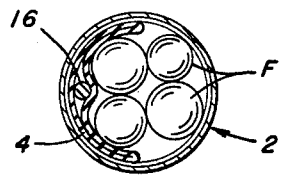
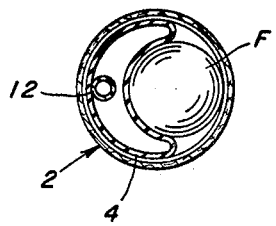
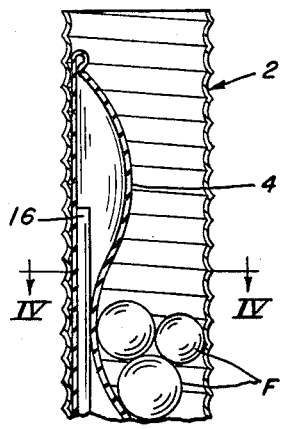
INVENTOR.
WILLIAM H. STOKES
By Donald S. Ferito
Attorney United States Patent Office 3,489,258
Patented Jan. 13, 1970

3,489,258
PULSATING FALL RETARDER
William H. Stokes, Lakewood, Ohio, assignor to United States Steel Corporation, a corporation of Delaware
Filed Apr. 29, 1968, Ser. No. 724,920
Int. Cl. B65g 11/20, 15/32
U.S. Cl. 193—7                                    2 Claims

ABSTRACT OF THE DISCLOSURE

Device comprises an elongated member, which may be in the form of a semi-rigid manifold having fluid openings spaced along its length, for preventing the complete collapse of the flexible pulsating element of an article-fall retarder in a conveyor tube. The device is disposed within the pulsating element and serves to prevent shut-off of pulses from the upper portion of the pulsating element, by oversize articles passing through the conveyor tube.

---

The present invention relates generally to material handling equipment and more particularly to means for retarding the free fall of articles being conveyed by gravity from elevated heights to containers disposed at a substantially lower elevation.

As certain types of tree-grown-fruit harvesting equipment frequently present a condition rendering desirable the utilizing of my invention, I have chosen to illustrate and describe a preferred embodiment of my invention in connection with such tree-grown-fruit harvesting equipment.

In the harvesting of tree-grown fruit, such as oranges, grapefruit, lemons, etc., a tube conveyor is frequently used to guide the fruit from an upper elevation where it is picked from the tree to a container disposed at a lower elevation or ground level. A flexible pulsatable tube of smaller diameter than the conveyor tube is provided within the latter extending substantially along its length. Air is alternately passed to and from the flexible inner tube to pulsate it and thereby retard the free fall of fruit through the conveyor tube. This is done to prevent bruising of the fruit when it falls into the cotnainer from the bottom of the conveyor tube.

Such apparatus usually functions satisfactorily until irregularly shaped fruit or a bridging formation of a plurality of fruit, as shown in FIGURES 3 and 4, lodges in the conveyor tube and pinches off the flexible pulsating tube while air is being passed from the pulsating tube. This blocks the passage of air to the portion of the flexible inner tube above the pinched-off area. Prior to my invention, this condition caused complete collapse of the upper portion of the pulsating inner tube and permitted the free fall of fruit from the upper entry end of the conveyor tube to the point where the blockage existed. This resulted in damage to the fruit involved which made it unacceptable for the fresh-fruit market.

It is, accordingly, the primary object of my invention to provide means for preventing the complete collapse of any portion of the pulsating free-fall retarder tube of an article conveyor tube.

It is a more specialized object of my invention to provide means as set forth above in the form of a sem-rigid elongated member disposed within the pulsating free-fall retarder tube extending substantially along its length.

As a corollary to the object above, it is another object of my invention to provide such a semi-rigid elongated member in the form of a hollow tube open at its lower end and having holes spaced along its length for the passage of air to and from the interior of the pulsating free-fall retarder tube.

These and other objects will become more apparent after referring to the following specification and attached drawings in which:

FIGURE 1 is a front elevational view partly in section of a fruit-harvesting conveyor tube having the device of the invention incorporated in the free-fall retarder tube thereof;

FIGURE 2 is a cross-sectional view taken substantially along the line II—II of FIGURE 1;

FIGURE 3 is a fragmentary vertical sectional view showing a fruit-harvesting conveyor tube having a modification of the device of the invention installed therein; and FIGURE 4 is a cross-sectional view taken substantially along the line III—III of FIGURE 3.

Referring more particularly to the drawing, reference character 2 designates a fruit-harvester conveyor tube which may be in the form of an elongated wire helix covered internally and externally with fabric, rubber, plastic or the like. A pulsatable free-fall retarder tube 4, made of rubber, plastic or other suitable flexible material is disposed within the conveyor tube 2 extending substantially along its length. The retarder tube 4 is fastened at least at its upper and lower ends to a portion of the inner surface of the conveyor tube. The upper end of the retarder tube 4 is closed to the atmosphere while its lower end projects from the bottom of the conveyor tube and is connected with a flexible hose 6 by means of a coupling 8. Flexible hose 6 is connected with a suitable combination pressure-vacuum pump 9 for alternately passing pressurized air to and evacuating air from the retarder tube 4 to pulsate the same. Pulsation or sequential deflation and inflation of the retarder tube 4 controls the free-fall of fruit F by allowing it to pass through the conveyor tube 2 in increments of its length, thus lowering the fruit gently from an elevated height to a receptacle 10 disposed a short distance below the lower end of the conveyor tube. In normal use the conveyor tube 2 is suspended from a picking platform or ladder (not shown).

A semi-rigid elongated manifold tube 12 is disposed within the retarder tube 4 extending substantially along its length. The manifold tube 12 is connected at its ends to the retarder tube 4 and has a diameter which is considerably less than the diameter of the retarder tube. The manifold tube 12 is open at its lower end and is provided with a plurality of holes 14 spaced along its length for the passage of air to and from the interior of the retarder tube 4.

In operation, alternately, pressure or vacuum is directed to the retarder tube 4 through the flexible hose 6 causing the retarder tube to become alternately inflated and deflated at a predetermined rate, for example, 60 cycles per minute. Fruit F placed in the upper end of the conveyor tube 2 at an elevated height is caused to fall within the conveyor tube when the retarder tube is deflated and is caught in place when the retarder tube is inflated. This pulsating action of the retarder tube causes the fruit to be lowered in short increments of height by gently retarding its fall so that at the exit end of the conveyor tube, the maximum free-fall is only the distance from the exit end of the conveyor tube to the bottom of the receptacle 10 into which it is directed. The latter distance is kept well within the limits that the particular fruit can tolerate free-falling without damage.

The purpose of the manifold tube 12, which is bendable along its length but resistant to deformation by the fruit being conveyed in the tube 2, is to allow free flow of air to and from the entire length of the interior of the retarder tube 4 in the event an oversized or irregularly shaped fruit or a bridging formation of a plurality of fruit lodges in the conveyor tube while the retarder tube is in the deflation phase of a pulsating cycle. The manifold tube 12 insures that the portion of the retarder tube above the point of blockage will continue to pulsate and retard the free fall of fruit in the conveyor tube above the lodged fruit.

If desired, a semi-rigid elongated member 16 of substantially solid cross-section, as shown in FIGURES 3 and 4, can be disposed in the retarder tube 4 to prevent its complete collapse in the event the retarder tube is pinched off at some point along its length by the fruit being conveyed. The presence of the semi-rigid solid member 16 would prevent complete flattening of the retarder tube and would permit the passage of air into and out of the retarder tube along the elongated member 16, as best shown in FIGURE 4.

Although I have shown but two embodiments of my invention, it will be apparent that other adaptations and modifications may be made without departing from the scope of the following claims.

I claim:

1. In an apparatus for conveying articles by gravity from an upper elevation to a lower one including a substantially vertically disposed conveyor tube having open upper and lower ends suspended by its upper end from a support at said upper elevation to receive articles into its upper end, a flexible inner tube having a closed upper end and an open lower end disposed within said conveyor tube, said flexible inner tube being attached to a face of the inner surface of said conveyor tube at least at its upper and lower ends and extending substantially along the length of said conveyor tube, and means connected with the open lower end of said flexible inner tube alternately passing fluid to and from said flexible tube for pulsating the same to thereby retard the free-fall of articles through said conveyor tube from said upper elevation, the improvement therewith of a semi-rigid elongated member inside of said inner tube extending substantially along its length adjacent the face of the inner surface of said conveyor tube to which said flexible inner tube is attached, said elongated member being attached at least at its two ends to said flexible tube and extending substantially along its length, said elongated member being bendable along its length but resistant to deformation by the articles being conveyed in said conveyor tube, said elongated member being effective to prevent complete collapse of said flexible tube.

2. Apparatus as defined by claim 1 in which said elongated member is in the form of a hollow tube open at its lower end and having holes spaced along its length for the passage of fluid to and from the interior of said flexible inner tube.

References Cited

UNITED STATES PATENTS 2,647,670    8/1953    Cox _____ 193—7

FOREIGN PATENTS 1,052,898    3/1959    Germany.

ANDRES H. NIELSEN, Primary Examiner

U.S. Cl. X.R.

193—32